US009745521B2

(12) United States Patent
Flores Oropeza et al.

(10) Patent No.: US 9,745,521 B2
(45) Date of Patent: Aug. 29, 2017

(54) DEHYDRATING AND DESALTING COMPOSITIONS OF CRUDE OILS, USING TRIBLOCK COPOLYMERS α,ω-BIFUNCTIONALIZED WITH AMINES

(71) Applicant: INSTITUTO MEXICANO DEL PETROLEO, Mexico City (MX)

(72) Inventors: Eugenio Alejandro Flores Oropeza, Mexico City (MX); Cesar Andres Flores Sandoval, Mexico City (MX); Reyna Reyes Martinez, Mexico City (MX); Jose Gonzalo Hernandez Cortez, Mexico City (MX); Alfonso Lopez Ortega, Mexico City (MX); Laura Veronica Castro Sotelo, Mexico City (MX); Fernando Alvarez Ramirez, Mexico City (MX); Arquimedes Estrada Martinez, Mexico City (MX); Flavio Salvador Vazquez Moreno, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 522 days.

(21) Appl. No.: 14/192,005

(22) Filed: Feb. 27, 2014

(65) Prior Publication Data
US 2014/0238901 A1    Aug. 28, 2014

(30) Foreign Application Priority Data
Feb. 28, 2013   (MX) ................... MX/A/2013/002359

(51) Int. Cl.
C10G 33/04   (2006.01)
C08L 71/02   (2006.01)
(Continued)

(52) U.S. Cl.
CPC ......... *C10G 33/04* (2013.01); *C08G 65/3344* (2013.01); *C08G 65/33303* (2013.01);
(Continued)

(58) Field of Classification Search
CPC ............................... C10G 33/04; C10G 31/08
See application file for complete search history.

(56) References Cited

U.S. PATENT DOCUMENTS

2009/0259004 A1   10/2009   Newman et al.
2009/0306232 A1   12/2009   Williams
2010/0140141 A1*   6/2010   Cendejas
                                 Santana ........... C08G 65/33306
                                                              208/188

FOREIGN PATENT DOCUMENTS

MX   Mx/a/2008/015756   12/2008
MX   MX/a/2011/003848   4/2011
(Continued)

OTHER PUBLICATIONS

Atta, A. et al., Demulsification of crude oil emulsions using some new water-soluble Schiff base surfactant blends, Journal of Dispersion Science and Technology, 29:1484-1495, 2008.
(Continued)

*Primary Examiner* — Randy Boyer
*Assistant Examiner* — Juan Valencia
(74) *Attorney, Agent, or Firm* — Dickinson Wright PLLC

(57) ABSTRACT

Compositions consisting of block copolymers α,ω-di-aryl or alkyl sulfonates of poly(ethylene oxide)$_w$-poly(propylene oxide)-poly(ethylene oxide)$_w$ of bis-ammonium and block copolymers α,ω-di-amine of poly(ethylene oxide)$_w$-poly (propylene oxide)-poly(ethylene oxide)$_w$, are provided that are effective in the dewatering and desalting crude oils whose specific gravities are within the range of 14 to 20° API. A method of dewatering and desalting heavy crude oil adds a mixture of the copolymer bifunctionalized with an aliphatic or aromatic secondary amine and a copolymer bifunctionalized with an aliphatic or aromatic tertiary amine.

9 Claims, 15 Drawing Sheets

(51) Int. Cl.
    *C10G 31/08*     (2006.01)
    *C08G 65/333*     (2006.01)
    *C08G 65/334*     (2006.01)

(52) U.S. Cl.
    CPC ............. *C08L 71/02* (2013.01); *C10G 31/08* (2013.01); *C08G 2261/126* (2013.01)

(56) References Cited

FOREIGN PATENT DOCUMENTS

| MX | MX/a/2011/004120 | 4/2011 |
| MX | MX/a/2013/002243 | 2/2013 |
| WO | 2007/115980 | 10/2007 |

OTHER PUBLICATIONS

Abdel-Azim, A. et al., Polyoxyalkylenated amines for breaking water-in-oil emulsions: Effect of structural variations on the demulsification efficiency, Polymers for Advanced Technologies, 9, 159-166 (1998).

Peng, J.X. et al., Novel magnetic demulsifier for water removal from diluted bitumen emulsion, Energy Fuels 2012, 26, 2705-2710.

Mirvakili, A. et al., Effect of a cationic surfactant as a chemical destabilization of crude oil based emulsions and asphaltene stabilized, J. Chem. Eng. Data 2012, 57, 1689-1699.

Feng, J. et al., Dilational viscoelasticity of the zwitterionic gemini surfactants with polyoxyethylene spacers at the interfaces, Journal of Dispersion Science and Technology, 32:1537-1546, 2011.

\* cited by examiner

DEHYDRATING AND DESALTING COMPOSITIONS OF CRUDE OILS, USING TRIBLOCK COPOLYMERS α,ω-BIFUNCTIONALIZED WITH AMINES

CROSS-REFERENCE TO RELATED APPLICATION

This application claims the benefit and priority to Mexican application No. MX/a/2013/002359 with a filing date of Feb. 28, 2013, the disclosure of which is incorporated herein by reference in its entirely.

FIELD OF THE INVENTION

The present invention relates to the synthesis of chemical products, compounds and compositions to separate water from emulsions with crude oil and to reduce the quantity of salts. In particular, the invention is related to the development of constituted composition for bifunctionalized copolymers with aliphatic and aromatics tertiary amines, and for bifunctionalized copolymers with secondary amines, and mixtures thereof, for their application as dehydrating and desalting agents in crude oils with API gravity are in the range of 14-20° API.

BACKGROUND OF THE INVENTION

Nowadays, the petroleum extraction gives the formation of water in crude oil emulsions, crude oil in water or inclusive ternary emulsion as water/crude oil/water and crude/water/crude These kinds of emulsion are produced by the turbulence provoked through pumping potency employed in the petroleum wells. The emulsions are favored and stabilized by natural compounds in the crude oil such as clays, naphthenic acids, oxidized hydrocarbons and asphaltenes. Emulsified water has dissolved salts such as calcium and magnesium carbonates, chlorides and sulphates and iron oxides and silica. If the emulsified water is not separate of crude oil, corrosion and scaling in all subsequent refining process (pipeline, storage tanks, distillation columns, heat exchangers, catalysts, piping system, etc.) can occur causing damage to the equipment. Additionally, produced crude oil should comply with international quality norms regarding water and salts maximum quantities, for its possible exportation [1].

Taking into account the previously described, it is convenient from economical point of view to separate water of the emulsion and simultaneously reduce the salt content in the crude oil.

At the beginning of last century, different chemical products have been used to break up water-crude oil emulsions, commonly those are added with constituted composition for emulsion breaking agents, coalescent agents and clarifiers. Most of these products are polymers, for example:

Alkoxylate alkylphenol-formaldehyde resins [2], alkoxylated epoxy resins [2], polyoxyethylene-polyoxypropylene-polyoxyethylene (POE-POP-POE) block copolymer and polyoxypropylene-polyoxyethylene-polyoxypropylene (POP-POE-POP) employing different initiators such as ethylendiamine or propylenglycol [3], polyethers, polyesters and polyurethane polyesters link by carboxylic diacids and diisocyanates [4], aliphatic and aromatic anhydrides in combination with esterified glycolic resins [5], crosslinking ethylcellulose over nano magnetic particles in combination with the application of extern magnetic fields [6], cationic surfactants [7], symmetric surfactants with space fragments like polyoxyethylene [8] between some others.

The Petroleum Mexican Institute (Molecular Engineering Program) has proposed several solutions to the dehydrated and desalted problem of crude oils. So far, the research group has presented five patent applications in the specific area of the applied scientific research. Two describe the utilization of formulation of triblock copolymer of ethylene polyoxide-propylene polyoxide-ethylene polyoxide and that are bifunctionalized with amines, for dehydrating heavy crude oil, achieving water removal around of 30 until 80% and salts of heavy crude oil around of 30 until 65% [9-10]. Another patent application discloses the application of ionic liquids individually and in formulation for dehydrating and desalting medium, heavy and superheavy crude oils (API gravity between 8 and 20) where efficiencies of dehydrated and desalted reached around 90% and 76%, 90% and 71%, 90% and 71%, respectively, and where the addition of the additive was in concentrations between 50 and 2000 ppm [11]. In another patent application, the synergic application of formulations of liquid ionic (LI's) and formulations of triblock copolymer α,ω-bifunctionalized with amines of type ethylene polyoxide-propylene polyoxide-ethylene polyoxide, each one of them individually or in formulations, in crude oils with gravities between 90 and 30° API [12]. Applicants copending application discloses the synthesis of novel triblock copolymers α,ω-bifunctionalized with tertiary amines (aliphatic and aromatics) and the application individually and in formulation as dehydrating and desalting agents of heavy crude oils whose gravities API are between 14-23° API [13].

REFERENCES

[1] Atta A M, Abdel Rahman A A H, Elsaeed S M, AbouElfotouh S, Hamad N A. Demulsification of crude oil emulsions using some new water-soluble Schiff base surfactants blends. J. Disp. Sci. Technol. 2008; 29:1484-1495.

[2] Hellberg P E, Uneback I. Environmentally-friendly oil/water demulsifier. Patent WO 2007/115980.

[3] Abdel-Azim A A A, Zaki N N, Maysour N E S. Polyoxyalkylenated amines for breaking water-in-oil emulsions: Effect of structural variations on the demulsification efficiency. Polymer Adv. Technol. 1998; 9:159-166

[4] Newman S P, Hahn C and McClain R D Environmentally friendly demulsifiers for crude oil emulsions. US 2009/0259004.

[5] Williams D E. Anhydride demulsifier formulations for resolving emulsion of water and oil. US 2009/0306232.

[6] Peng J X, Liu Q X, Xu Z H, Masliyah J. Novel magnetic demulsifier for water removal from diluted bitumen emulsion. Energy Fuels 2012; 26:2705-2710.

[7] Mirvakili A, Rahimpour M R, Jahanmiri A. Effect of a cationic surfactant as a chemical destabilization of crude oil based emulsions and asphaltene stabilized. J. Chem. Eng. Data 2012; 57:1689-1699.

[8] Feng J, Liu X P, Zhang L, Zhao S, Yu J Y. Dilational viscoelasticity of the zwitterionic Gemini surfactants with polyoxyethylene spacers at the interfaces. J. Disp. Sci. Technol. 2011; 32:1537-1546.

[9] Cendejas G, Flores E A, Castro L V, Estrada A, Lozada M, Vázquez F S (2008) Formulaciones desemulsificantes y deshidratantes para crudos pesados a base de copolímeros en bloques bifuncionalizados con aminas, Mx/a/2008/015756.

[10] Cendejas G, Flores E A, Castro L V, Estrada A, Lozada M, Vázquez F S (2010) Demulsifying and dehydrating formulations for heavy crude oils base on block copolymers bifunctionalized with amines, US 2010/0140141 A1

[11] Flores E A, Castro L V, Lopez A, Hernandez J G, Alvarez F, Vazquez F S, Estrada A, Lozada M. Deshidratación y desalado de crudos medios, pesados y extrapesados utilizando líquidos iónicos y sus formulaciones. Solicitud de patente mexicana (IMP-959, MX/a/2011/003848).

[12] Flores E A, Castro L V, Lopez A, Hernandez J G, Alvarez F, Estrada A, Vazquez F S, Formulaciones sinérgicas de copolímeros funcionalizados y liquidos ionicos para el deshidratado y desalado de aceites crudos medianos, pesados y extrapesados. (IMP-953, MX/a/2011/004120).

[13] Flores E A, Flores C A, Reyes R, Hernandez J G, Lopez A, Castro L V, Alvarez F, Estrada A, Vazquez F S. Copolímeros en bloques. Síntesis y use como agentes deshidratantes y desalantes de crudos pesados. (IMP-986, MX/a/2013/002243).

SUMMARY OF THE INVENTION

The present invention is directed to compositions comprising triblock copolymers $\alpha,\omega$-bifunctionalized with tertiary amines (aliphatics and aromatics) and triblock copolymers $\alpha,\omega$-bifunctionalized with secondary amines. The compounds were evaluated in different kinds of crude oils, reaching dehydrated and desalted efficiencies around (80-100%) and (65-86%), respectively, which outperforms the IMP-RHS5 commercial formulation.

The present invention is further directed to a composition or formulation for dehydrating and desalting heavy crude oil comprising a synergistic mixture of PEO-PPO-PEO copolymers that are bifunctionalized with an aliphatic or aromatic secondary amine and a PEO-PPO-PEO copolymer that is bifunctionalized with an aliphatic or aromatic tertiary amine. The combination of the secondary amine and tertiary amine functionalized copolymers provide improved dehydrating and desalting of crude oil compared to the copolymers when used alone.

The features of the invention are also directed to a method of demulsifying, desalting and dewatering heavy crude oil having a specific gravity of 14 to 20° API by adding an effective amount of a desalting and dewatering agent containing a synergistic mixture of a PEO-PPO-PEO copolymer that is bifunctionalized with an aliphatic or aromatic secondary amine and a PEO-PPO-PEO copolymer that is bifunctionalized with an aliphatic or aromatic tertiary amine.

These and other aspects of the invention will become apparent from the following detailed description of the drawings which disclose various embodiments of the invention.

BRIEF DESCRIPTION OF THE DRAWINGS

The figures of the present invention are graphs showing the results of the assessment of the dehydrating and desalting activity of compositions prepared from block copolymers $\alpha,\omega$-bifunctionalized with tertiary amines (aliphatic and aromatic) and block copolymers $\alpha,\omega$-bifunctionalized with secondary amines and some commercial products, in crude oils whose gravities are in the range 14-23° API. The results of a commercial formulation called IMP-RHS-5 is also included, by comparison way.

In the present invention, block copolymers with $\alpha,\omega$-bifunctionalized secondary amines previously developed by our research group [9-10] as follows: The compounds were identified with the following keys:

IMP-CF1 (Mn=2200 g/mole, l=1.1), IMP-CF22H (Mn=2500 g/mole, l=1.12) IMP-CF19 (Mn=2250 g/mole, l=1.06), IMP-CF22H (Mn=2500 g/mole, l=1.05), IMP-CF19H (Mn=2500 g/mole, l=1.05) [9-10], to create synergistic compositions with block copolymers $\alpha,\omega$-bifunctionalized tertiary amine (aliphatic and aromatic), compounds IMP-CF23H-IMP-CF29H (Mn=2500 g/mole, l=1.05) [13].

Figure 1:
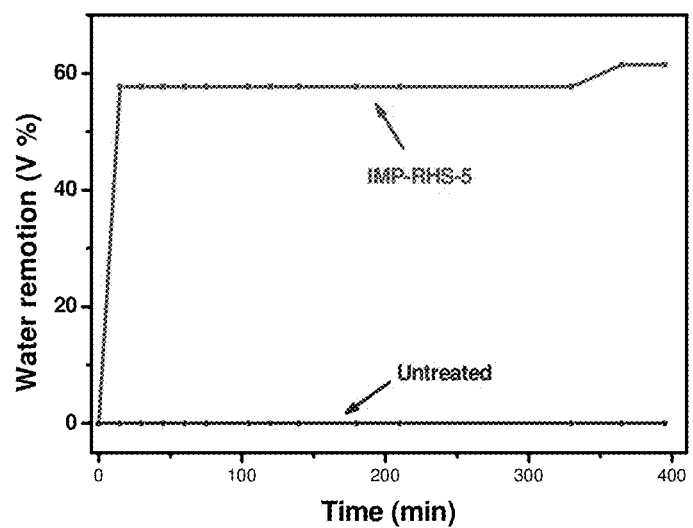

In particular, these figures represent the following:

FIG. 1 is a graph showing the demulsifying activity of the IMP-RHS-5 commercial formulations on crude oil CM-A at 80° C. and 600 ppm.

Figure 2:
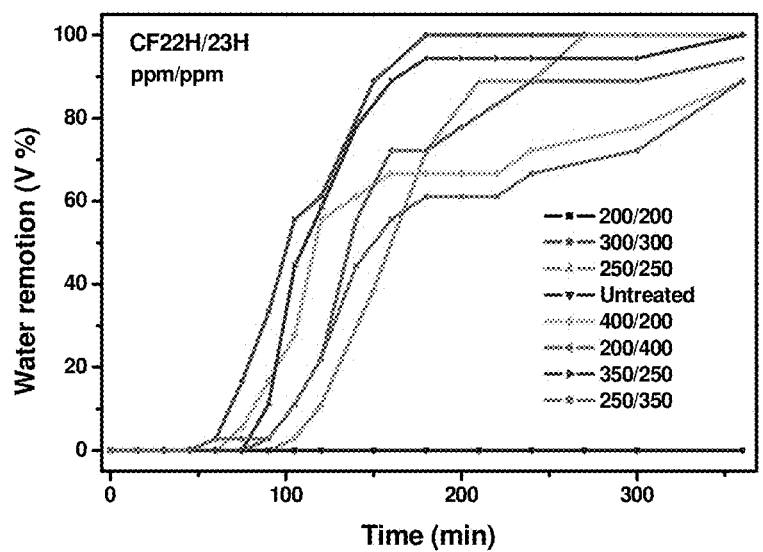

FIG. 2 is a graph showing the demulsifying activity of compositions based on IMP-CF23H copolymer and IMP-CF22H copolymer on crude oil CM-A at 80° C.

Figure 3:
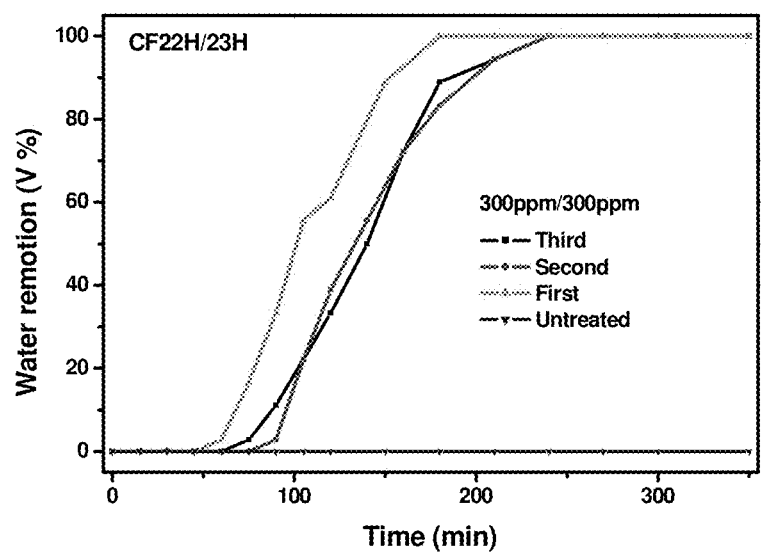

FIG. 3 is a graph showing the demulsifying activity by triplicate of composition based on IMP-CF23H triblock copolymer and IMP-CF22H copolymer on crude oil CM-A at 80° C.

Figure 4:
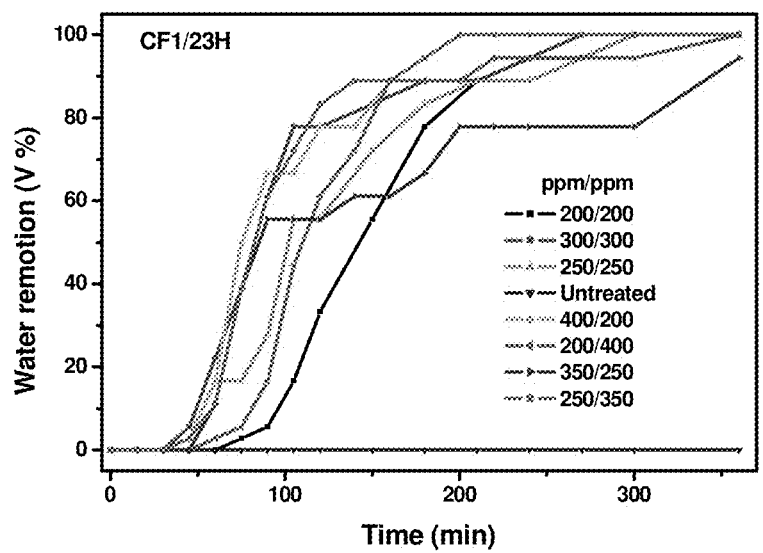

FIG. 4 is a graph showing the demulsifying activity of compositions consisting of the IMP-CF23H copolymer and IMP-CF1 copolymer on crude oil CM-B at 80° C.

Figure 5:
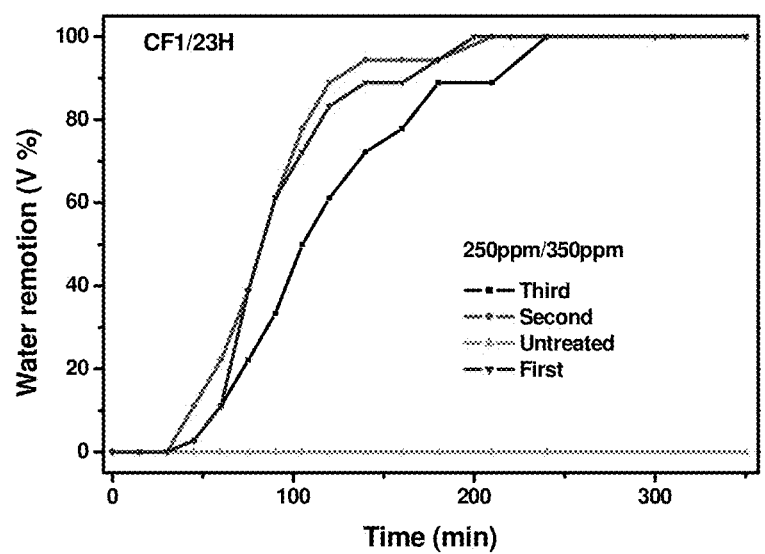

FIG. 5 is a graph showing the demulsifying activity by triplicate of compositions based on the IMP-CF23H copolymer and IMP-CF1 copolymer on crude CM-B at 80° C.

Figure 6:
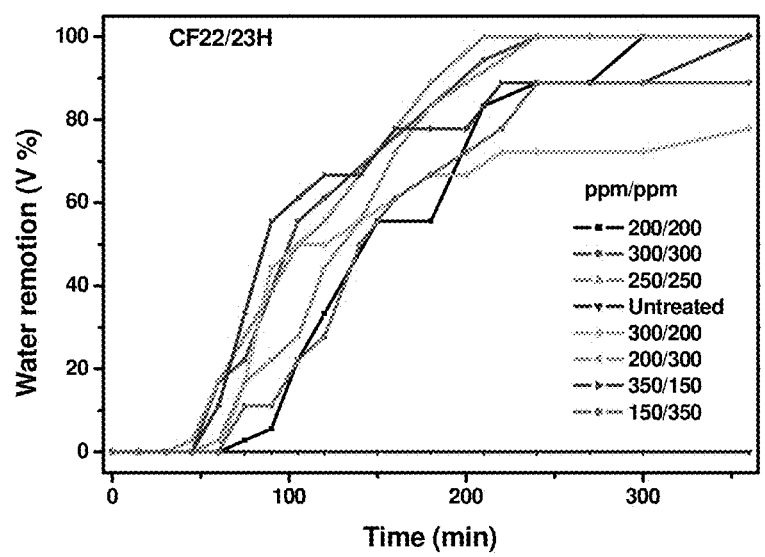

FIG. 6 is a graph showing the demulsifying activity of compositions based on the IMP-CF22 and IMP-CF-23H copolymers.

Figure 7:
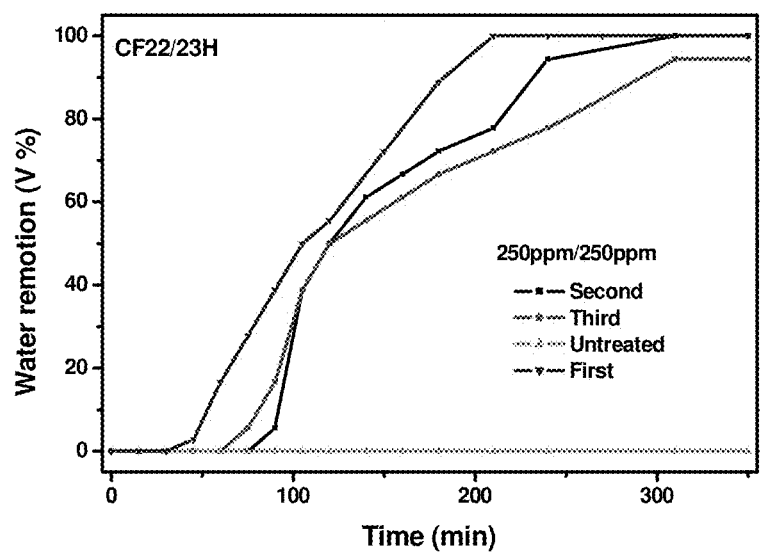

FIG. 7 is a graph showing the demulsifying activity by triplicate of composition of IMP-CF22 and IMP-CF-23H copolymers.

Figure 8:
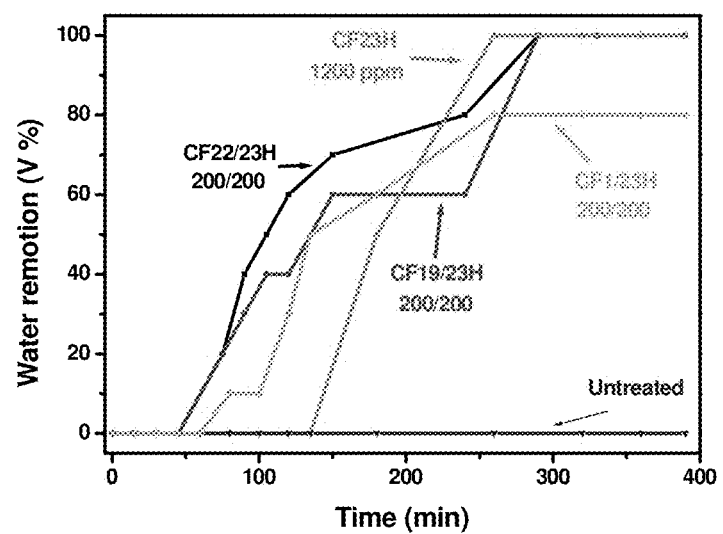

FIG. 8 is a graph showing the demulsifying activity of compositions based on the IMP-CF23H copolymer and IMP-CF1, IMP-CF19 and IMP-CF22 copolymers on crude oil CM-C at 80° C.

Figure 9:
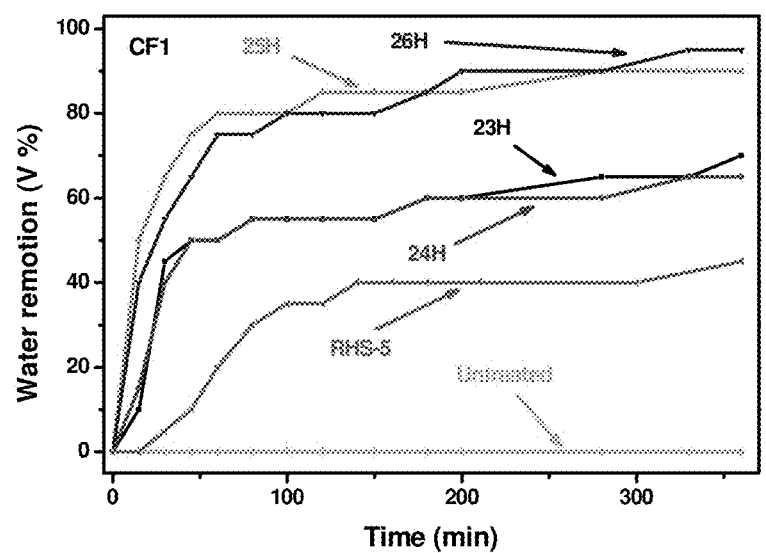

FIG. 9 is a graph showing the demulsifying activity of mixtures (300 ppm/300 ppm) of IMP-CF1 and IMP-CF23H-IMP-CF26H copolymers on crude oil CM-D at 80° C.

Figure 10:
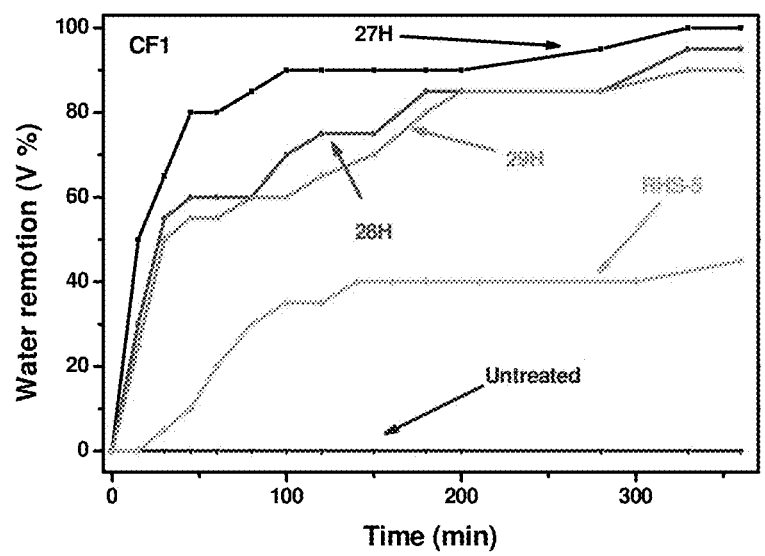

FIG. 10 is a graph showing the demulsifying activity of mixtures (300 ppm/300 ppm) of IMP-CF1 and IMP-CF27H-IMP-CF29H copolymers on crude oil CM-D at 80° C.

Figure 11:
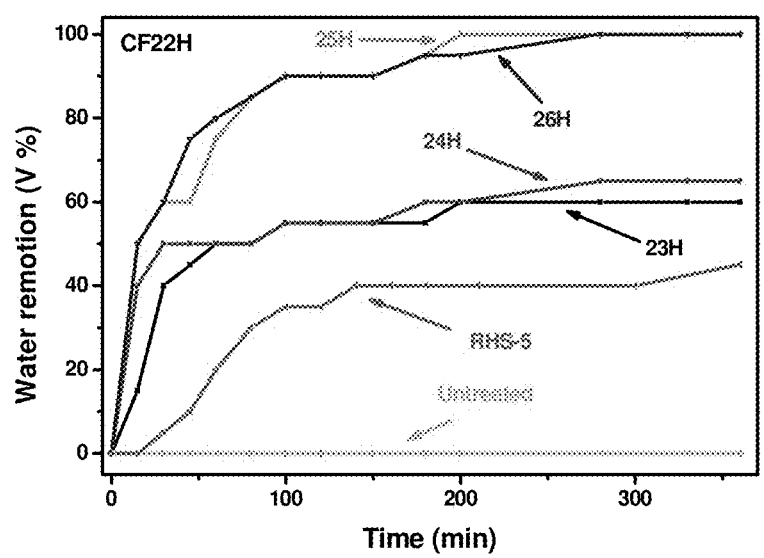

FIG. 11 is a graph showing the demulsifying activity of the IMP-RHS-5 formulation at 600 ppm and mixtures (300 ppm/300 ppm) of IMP-CF23H-26H and IMP-CF22H copolymers on crude oil CM-D at 80° C.

Figure 12:
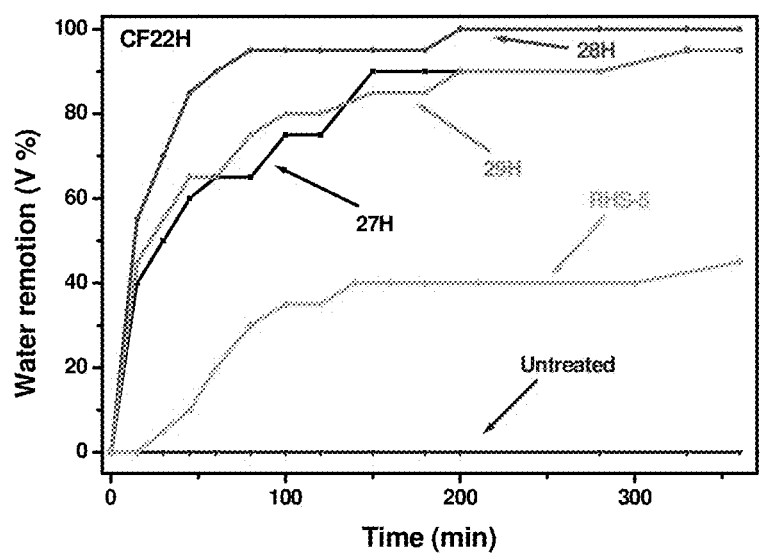

FIG. 12 is a graph showing the demulsifying activity of the IMP-RHS-5 formulation at 600 ppm and compositions (300 ppm/300 ppm) of IMP-CF27H-29H copolymers and IMP-CF22H copolymer on crude oil CM-D at 80° C.

Figure 13:
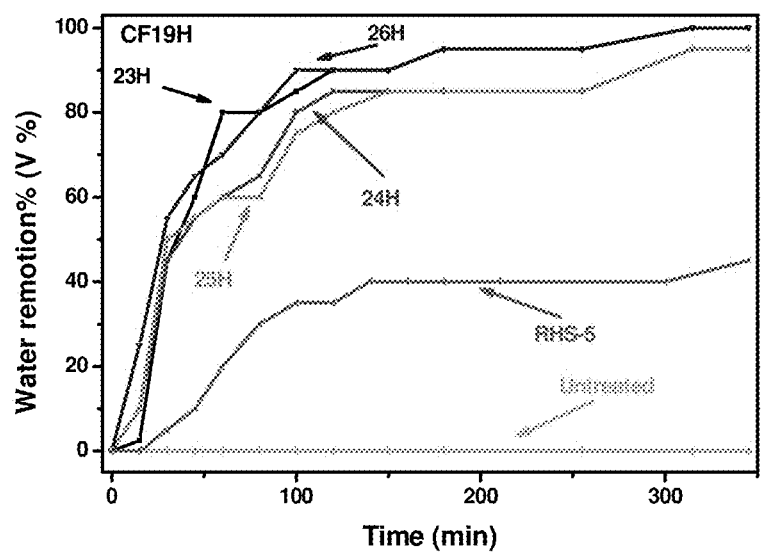

FIG. 13 is a graph showing the demulsifying activity of the IMP-RHS5 formulation at 600 ppm and compositions (300 ppm/300 ppm) of IMP-CF23H-26H copolymer and IMP-CF19H copolymer on crude oil CM-D at 80° C.

Figure 14:
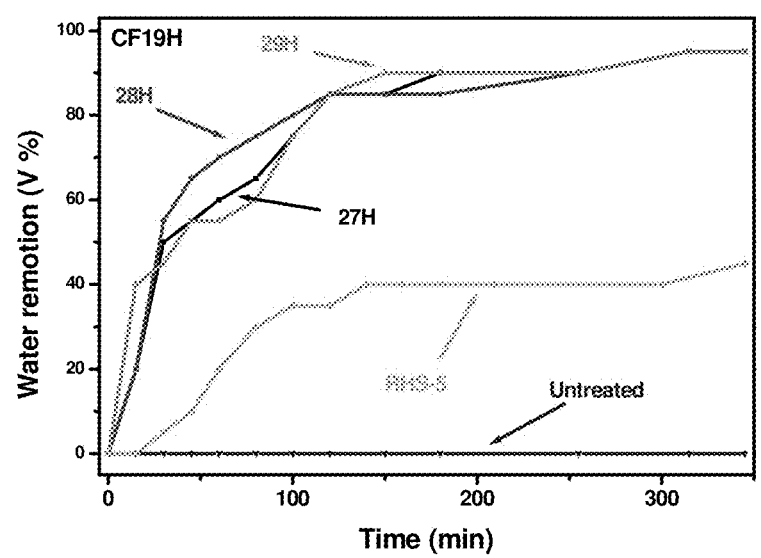

FIG. 14 is a graph showing the demulsifying activity of the IMP-RHS5 formulation at 600 ppm and compositions (300 ppm/300 ppm) of IMP-CF27H-29H copolymer and IMP-CF19H copolymer on crude oil CM-D at 80° C.

Figure 15:
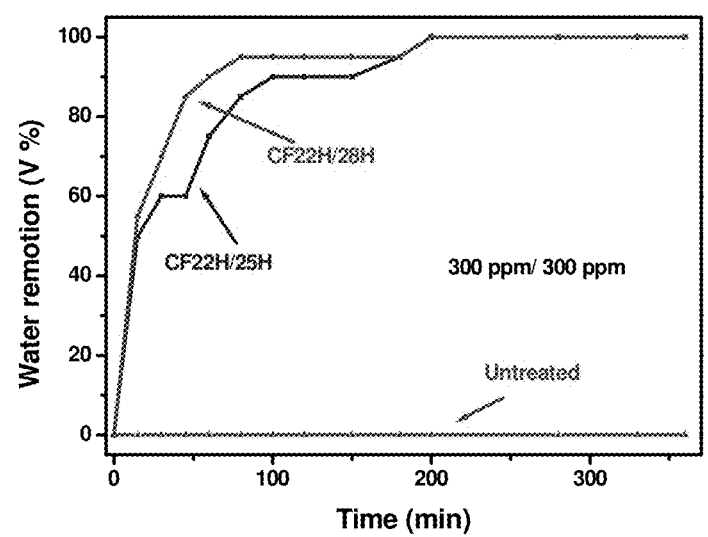

FIG. 15 is a graph showing the demulsifying activity of mixtures (300 ppm/300 ppm) of IMP-CF25H and IMP-CF28H block copolymers with IMP-CF22H block copolymer on crude oil CM-D at 80° C.

DETAILED DESCRIPTION OF THE INVENTION

The present invention is directed to the production of synergic compositions comprising at least one poly(ethylene oxide)$_w$-poly(propylene oxide)$_y$-poly(ethylene oxide)$_w$ α,ω-di-aryl or alkyl sulfonate of bis-ammonium {poly(ethylene oxide)$_2$-poly(propylene oxide)$_y$-poly(ethylene oxide)$_2$ block copolymers α,ω-bifunctionalized aliphatic and tertiary amines}; and by at least one α,ω-di-amino-poly(ethylene oxide)$_w$-poly(propylene oxide)$_y$-poly(ethylene oxide)$_w$ {poly(ethylene oxide)$_w$-poly(propylene oxide)$_y$-poly(ethylene oxide)$_w$ block copolymers α,ω-bifunctionalized with aliphatic and aromatic secondary amines (CF's)}. The invention is also directed to compositions and formulations containing a synergistic mixture of these copolymers in solvents with a boiling point is in the range between 35 and 200° C., preferentially dichloromethane, chloroform, benzene, toluene, xylene, turbosine, naphtha, individually or mixtures thereof. The solutions are prepared in a range of between 100 ppm (0.01 wt. %) and 50000 ppm (5 wt. %). The compositions can comprise a solvent or carrier and at least one of the secondary amine modified copolymers and at least one of the tertiary amine modified copolymers. In another embodiment, the composition can have a solvent or carrier where the demulsifying, desalting and dewatering agent consists essentially of a secondary amine modified copolymer and at least one tertiary amine modified copolymer as the only demulsifying, desalting and dewatering agents.

The present invention is also directed to methods of dehydrating and desalting crude oils of API gravities between 14-20° API by adding the synergistic combination of the copolymers. The compositions are added in a small volume of solution and hindering carefully that the solvent included in the mixtures has some influence on the emulsion breaking.

The present invention is directed to a composition comprising a synergistic mixture or combination of a block PEO-PPO-PEO copolymer that is bifunctionalized with a secondary amine and having an average molecular weight of 800 to 4000 Daltons, and a block PEO-PPO-PEO copolymer bifunctionalized with a tertiary amine. The composition can include a solvent having a boiling point of 35° to 200° C. where the copolymers are included in an amount of about 100 ppm (0.01 wt %) to 50,000 ppm (5 wt %)).

The copolymer functionalized with an aliphatic or aromatic secondary amine is an amine bifunctionalized block copolymer of the formula 5a and 5b, having a molecular weight within the average range between 800 and 4000 Daltons Where:

w and y numbers are in the range of 10 to 60;

$R_1$ and $R_2$ radicals are independently selected from the group consisting of —H; —CH$_2$(CH$_2$)$_A$B; —CEGJ; —CH$_2$CHLM; —CH$_2$(CH$_2$)$_Q$M;

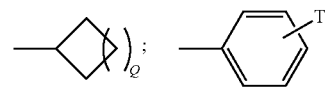

where A is a number between 1 and 9,

B is H,

E, G and J are independently a radical selected from the group consisting of: —H, methyl, ethyl, n-propyl, iso-propyl, sec-butyl, iso-butyl, tert-butyl, n-butyl, phenyl, cyclohexyl, cyclopentyl, L is a radical represented by methyl or ethyl and M is a hydroxyl group, Q is a number between 1 and 5, T is selected from the group consisting of —H, methyl, ethyl, n-propyl, iso-propyl, sec-butyl, iso-butyl, tert-butyl, n-butyl, phenyl, cyclohexyl, cyclopentyl, NO$_2$, Cl, F and Br, and

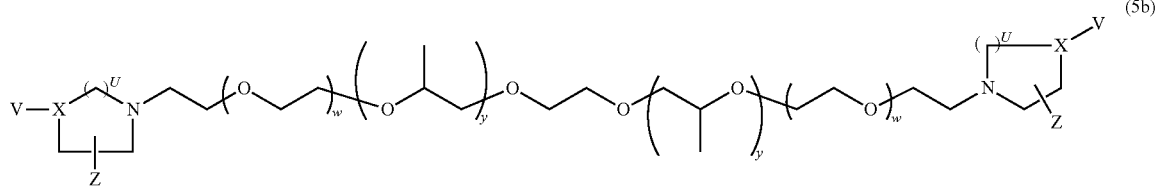

where:

U is a number between 1 and 2,

X is represented by atoms of oxygen and nitrogen, when X is nitrogen then V is represented by, -methyl, ethyl, n-propyl, iso-propyl, sec-butyl, iso-butyl, tert-butyl, n-butyl phenyl, cyclohexyl, cyclopentyl, benzyl, Z is represented by methyl, ethyl, n-propyl, iso-propyl, sec-butyl, iso-butyl, tert-butyl, n-butyl, phenyl, cyclohexyl, cyclopentyl, benzyl or hydroxyl at any position of the 5 or 6 members' rings.

The preferred amines of the present invention are: 2-(methylamino)-ethanol, 2-(butylamino)-ethanol, 2-(benzylamino)-ethanol, 2-(cyclohexylamino)-ethanol, 2-(tert-butylamino)-ethanol, 2-(phenylamino)-ethanol, 2-(n-propylamino)-ethanol, 2-(iso-propylamino)-ethanol, 2-(hydroxymethylamino)-ethanol, 2,2'-iminodiethanol, 1,1'-iminodi-2-propanol, 4-(butylamino)-1-butanol, 1-ben-

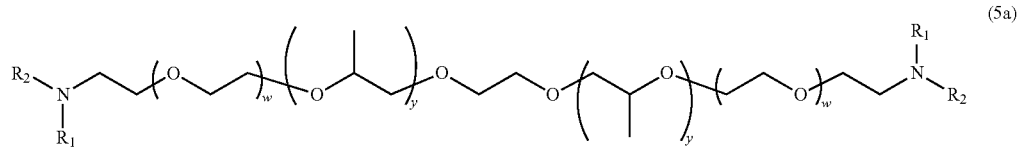

zylpiperazine, 1-phenylpiperazine, 2-(hexylamino)-ethanol, 1-acetylpiperazine, 1-(orto-chlorophenyl)-piperazine, 1-ethylpiperazine, 1-(meta-tolyl)-piperazine, 1-(4-nitrophenyl)-piperazine, 4-benzylpiperidine, 4-methylpiperidine, 2-methylpiperidine, 2-ethylpiperidine, 3,5-dimethylpiperidine, piperidin-3-ol, piperidin-4-ol, trans-3,5-dimethylpiperidine, cis-3,5-dimethylpiperidine, 3-methylpiperidine, piperidin-3-ylmethanol, 3,3-dimethylpiperidine, 4-phenylpiperidin-3-ol, 4-phenyl-piperidine, 4-(piperidin-4-yl)morpholine, 4,4'-bipiperidine, pyrrolidin-3-amine, 2,6-dimethylmorpholine, morpholine, pyrrolidin-2-ylmethanol, trans-2,5-dimethylpyrrolidine, cis-2,5-dimethylpyrrolidine, diphenylamine, 2-nitro-diphenyl amine, 4-nitro-diphenylamine, pyrrolidine, 4,4'bis(dimethylamino)-diphenylamine, 2,4-dinitro-diphenylamine 4,4'-dimethoxy-diphenylamine, diethylamine, dipropylamine, dibutylamine, dipentylamine, dihexylamine, dioctylamine, didecylamine, didodecylamine, dinonylamine, N-methyl-hexylamine, di-iso-propylamine, N-iso-propyl-tert-butylamine, N-ethyl,-tert-butylamine, N-ethyl-butylamine, di-iso-butylamine, iso-butyl-sec-butylamine, di-iso-pentylamine, ethyl-n-dodecylamine, Bis(2-ethylhexyl)amine, di-tert-amyl-amine, N-methyl-pentylamine, N-methyl-butylamine, N-methyl-tert-butilamine, N-ethyl-iso-propylamine, N-ethyl-propylamine, N-methyl-octylamine, piperidine.

The block copolymers can be produced by the method disclosed in U.S. 2010/0140141, which is hereby incorporated by reference in its entirety.

Examples of suitable copolymers include

Example 1

α,ω-di (N-tert-butyl, N-ethanol)-amine-poly(ethylene oxide)$_w$-poly(propylene oxide)$_y$-poly(ethylene oxide)$_w$ ($R_1$=ter-butyl, $R_2$=ethanol): viscous liquid; I.R. υ cm$^{-1}$: 3267, 2965, 2933, 2909; 2856, 1464, 1378, 1361, 1222, 1102, 952, 847; $^{13}$C NMR (DMSO d6): 17.1, 28.8, 50.3, 52.4, 58.1, 59.9, 69.1, 70.4, 72.4, 73.3, 75.4, 75.6.

Example 2

α,ω-di-(N-ethyl,N-ethanol)-amine-poly(ethylene oxide)$_w$-poly(propylene oxide)$_y$-poly(ethylene oxide)$_w$ ($R_1$=ethyl, $R_2$=ethanol): viscous liquid; I.R.ν cm$^1$: 3450, 2985, 2840, 1450, 1370, 1270, 1220, 1100, 890, 700; $^{13}$C NMR (DMSO d$_6$): 17.43, 42.71, 48.6, 52.7, 55.5, 59.0, 70.5, 72.9, 73.35, 75.1, 75.5.

Example 3

α,ω-di-Morpholinyl-poly(EG)$_w$-poly(ethylene oxide)$_w$-poly(propylene oxide)$_y$-poly(ethylene oxide)$_w$; colorless viscous liquid, I.R.ν cm$^{-1}$: 2980, 2920, 2850, 1470, 1370, 1350, 1325, 1270, 1120, 910; $^{13}$C NMR (DMSO d$_6$): 17.11, 53.68, 58.0, 66.65, 68.39, 70.39, 72.72, 73.16, 74.9, 75.19, 75.34.

Example 4

α,ω-diamine-poly(ethylene oxide)$_w$-poly(propylene oxide)$_y$-poly(ethylene oxide)$_w$, ($R_1$=$R_2$=H): colorless viscous liquid; I.R.ν cm$^{-1}$: 3400, 2990, 2845, 1450, 1380, 1350, 1100, 910, 850; $^{13}$C NMR (DMSO d$_6$): 17.1, 42.5, 53.3, 68.4, 70.3, 72.7, 73.1, 74.9, 75.1.

Example 5

α,Ω-di-piperidinyl-poly(ethylene oxide)$_w$-poly(propylene oxide)$_y$-poly(ethylene oxide)$_w$; colorless viscous liquid, I.R.ν cm$^{-1}$: 3379, 2965, 2936, 2864, 1467, 1444, 1377, 1279, 1164, 1100, 858; $^{13}$C NMR (DMSO d$_6$) 17.3, 25.8, 26.2, 54.6, 57.5, 68.7, 70.5, 72.9, 73.3, 75.2, 75.6, 75.5.

Example 6

α,ω-di-pyrrolidinyl-poly(ethylene oxide)$_w$-poly(propylene oxide)$_y$-poly(ethylene oxide)$_w$; colorless viscous liquid, I.R.ν cm$^{-1}$: 3385, 2966, 2940, 1461, 14050, 1221, 1146, 1115, 1041, 900 $^{13}$C NMR (DMSO d$_6$) 17.2, 26.2, 54.7, 58.5, 68.9, 70.54, 72.8, 73.4, 75.3, 75.5, 75.6.

Example 7

α,ω-bis-(N,N-diphenyl)-amine-poly poly(ethylene oxide)$_w$-poly(propylene oxide)$_y$-poly(ethylene oxide)$_w$; ($R_1$=$R_2$=phenyl) colorless viscous liquid, I.R.ν cm$^{-1}$: 3061, 3024, 2931, 2879, 1592, 1575, 1496, 1343, 1253, 1132, 1100, 864, 750, 694; $^{13}$C NMR (DMSO d$_6$) 17.25, 58.5, 67.9, 70.55, 73.0, 73.35, 75.15, 75.45, 75.57, 117.5, 119.3, 129.4, 149.2.

Example 8

α,ω-di-(N-methyl, N-ethanol)-amine poly(ethylene oxide)$_w$-poly(propylene oxide)$_y$-poly(ethylene oxide)$_1$ ($R_1$=methyl, $R_2$=ethanol): viscous liquid; I.R.ν cm$^{-1}$: 3323, 2939, 2866, 2800, 1460, 1377, 1270, 1220, 1100, 1069, 883, 7641; $^{13}$C NMR (DMSO d$_6$): 17.2, 42.9, 57.6, 59.1, 59.8, 68.7, 70.4, 72.7, 73.4, 75.15, 75.8.

Example 9

α,ω-bis-(N,N-diethyl)-amine-poly(ethylene oxide)$_w$-poly(propylene oxide)$_y$-poly(ethylene oxide)$_w$; ($R_1$=$R_2$=ethyl) colorless viscous liquid, I.R.ν cm$^{-1}$: 3388, 2973, 2838, 2789, 1473, 1381, 1227, 1156, 1100, 992; $^{13}$C NMR (DMSO d$_6$): 13.5 17.15, 49.7, 55.6, 68.5, 70.6, 73.1, 73.25, 75.25, 75.5, 75.7.

Example 10

α,ω-bis-(N,N-dihexyl)-amine-poly(ethylene oxide)$_w$-poly(propylene oxide)$_y$-poly(ethylene oxide)$_w$; ($R_1$=$R_2$=hexyl) colorless viscous liquid, I.R.ν cm$^{-1}$: 3283, 2957, 2927, 2857, 1467, 1378, 1105, 892, 726; $^{13}$C NMR (DMSO d$_6$): 13.9 17.15, 22.8, 27.6, 29.1, 32.4, 54.2, 55.3, 68.9, 69.9, 73.2, 73.8, 75.3, 75.6, 75.8.

Example 11

α,ω-bis-(N,N-dibenzyl)-amine-poly poly(ethylene oxide)$_w$-poly(propylene oxide)$_y$-poly(ethylene oxide)$_w$; ($R_1$=$R_2$=benzyl) colorless viscous liquid, I.R.ν cm$^{-1}$: 3086, 3063, 2980, 2944, 2836, 2786, 1601, 1496, 1463, 1366, 1100, 1026, 977, 737, 698; $^{13}$C NMR (DMSO d$_6$): 17.2, 54.6, 60.9, 68.8, 73.2, 73.8, 75.45, 75.7, 75.9.

Example 12

α,ω-bis-(N-benzyl, N-butyl)-amine-poly(ethylene oxide)$_w$-poly(propylene oxide)$_y$-poly(ethylene oxide)$_w$; ($R_1$=benzyl, $R_2$=butyl) colorless viscous liquid, I.R.ν cm$^{-1}$: 3309, 2957, 2871, 1646, 1454, 1377, 1200, 1102, 1028, 732, 698; $^{13}$C NMR (DMSO d$_6$): 14.1, 17.4, 20.6, 30.9, 54.6, 55.2, 68.8, 73.0, 73.9, 75.5, 75.7, 75.8.

Example 13

α,ω-di-(N-methyl)-piperazinyl-poly(ethylene oxide)$_w$-poly(propylene oxide)$_y$-poly(ethylene oxide)$_w$; colorless viscous liquid, I.R.ν cm$^{-1}$: 3450, 3300, 2980, 2850, 1470, 1370, 1310, 1265, 1220, 1150, 1100, 910, 750; $^{13}$C NMR (DMSO d$_6$): 17.3, 45.9, 53.43, 54.87, 57.74, 70.54, 72.83, 73.3, 75.15, 75.34, 75.52.

Example 14

α,ω-di-(4-phenyl)-piperazinyl-poly(ethylene oxide)$_w$-poly(propylene oxide)$_y$-poly(ethylene oxide)$_w$: viscous liquid; I.R.ν cm$^{-1}$: 3270, 3037, 3024, 2943, 2909, 2823, 1609, 1457, 1380, 1234, 1147, 1100, 938, 758, 692, 618, 517; $^{13}$C NMR (DMSO d$_6$): 17.4, 48.7, 51.5, 54.8, 68.9, 70.1, 71.9, 73.1, 75.5, 75.8, 114.1, 118.5, 129.7, 149.6.

Example 15

α,ω-bis-(N,N-dibutyl)-amine-poly(ethylene oxide)$_w$-poly(propylene oxide)$_y$-poly(ethylene oxide)$_w$; (R$_1$=R$_2$=butyl) colorless viscous liquid, I.R.ν cm$^{-1}$: 2961, 2931, 2874, 1465, 1436, 1378, 1129, 1100, 960; $^{13}$C NMR (DMSO d$_6$): 13.5 17.15, 20.7, 30.7, 53.7, 55.4, 68.7, 70.3, 73.4, 73.7, 75.4, 75.5, 75.8.

Example 16

α,ω-di-(N-butyl,N-ethanol)-amine poly(ethylene oxide)$_w$-poly(propylene oxide)$_y$-poly(ethylene oxide)$_w$ (R$_1$=butyl, R$_2$=ethanol): viscous liquid; I.R.ν cm$^{-1}$: 3450, 2957, 2873, 1468, 1378, 1274, 1204, 1060, 1100, 890, 700; $^{13}$C NMR (DMSO d$_6$): 12.1, 17.25, 20.6, 30.9, 54.5, 55.5, 57.6, 59.1, 68.7, 70.5, 72.8, 73.3, 75.15, 75.7.

Example 17

α,ω-bis-(N,N-diciclohexyl)-amine-poly(ethylene oxide)$_w$-poly(propylene oxide)$_y$-poly(ethylene oxide)$_w$; (R$_1$=R$_2$=ciclohexyl) colorless viscous liquid, I.R.ν cm$^{-1}$: 2928, 2852, 2761, 1449, 1387, 1261, 1187, 1103, 1050, 974, 849; $^{13}$C NMR (DMSO d$_6$): 17.1, 23.7, 28.2, 32.1, 51.6, 60.3, 69.3, 73.25, 73.6, 75.5, 75.75, 75.9.

Example 18

α,ω-di-(N-benzyl, N-ethanol)-amine poly(ethylene oxide)$_w$-poly(propylene oxide)$_y$-poly(ethylene oxide)$_w$ (R$_1$=benzyl, R$_2$=ethanol): viscous liquid; I.R.ν cm$^{-1}$: 3411, 3062, 3028, 2946, 2931, 2883, 2802, 1602, 1453, 1367, 1248, 1076, 1102, 913, 746, 734; $^{13}$C NMR (DMSO d$_6$): 17.3, 55.8, 57.5, 59.2, 59.5, 68.9, 70.45, 72.5, 73.2, 75.3, 75.7.

Example 19

α,ω-di-(iminodiethanol)-amine poly(ethylene oxide)$_w$-poly(propylene oxide)$_y$-poly(ethylene oxide)$_w$ (R$_1$=ethanol, R$_2$=ethanol): viscous liquid; I.R.ν cm$^{-1}$: 3450, 2980, 2950, 2865, 1650, 1450, 1390, 1320, 1260, 1220, 1105, 900, 720; $^{13}$C NMR (DMSO d$_6$): 17.27, 42.71, 54.39, 57.52, 59.68, 70.54, 72.87, 73.3, 75.14, 75.33, 75.55.

Example 20

α,ω-di-(3-hydroxy)-piperidinyl poly(ethylene oxide)$_w$-poly(propylene oxide)$_y$-poly(ethylene oxide)$_w$: viscous liquid; I.R.ν cm$^{-1}$: 2970, 2938, 2860, 2804, 2776, 1474, 1348, 1262, 1220, 1167, 1100, 960, 786; $^{13}$C NMR (DMSO d$_6$): 17.2, 18.8, 31.8, 54.5, 55.7, 62.5, 68.9, 69.2, 70.1, 71.9, 73.1, 75.5, 75.8.

The copolymers functionalized with a tertiary amine, include α,ω-di-aryl or alkyl sulfonates of poly(ethylene oxide)$_w$-poly(propylene oxide)-poly(ethylene oxide)$_w$ of bis-ammonium characterized by having following structural general formulas (1) to (5).

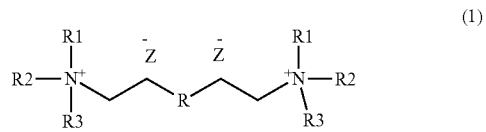

(1)

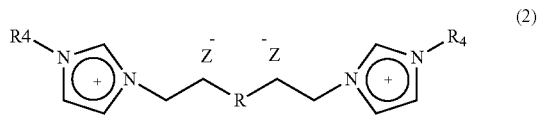

(2)

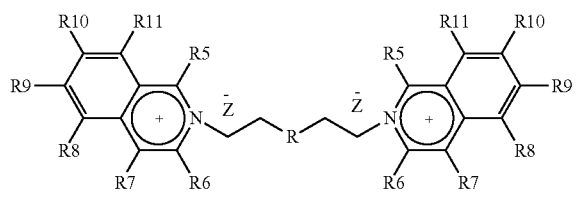

(3)

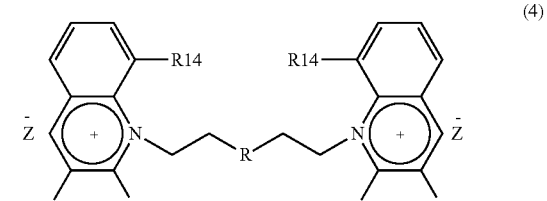

(4)

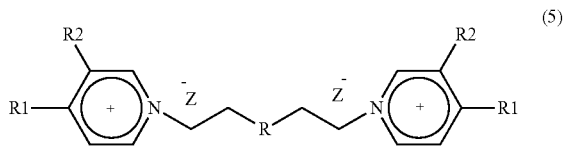

(5)

where R is

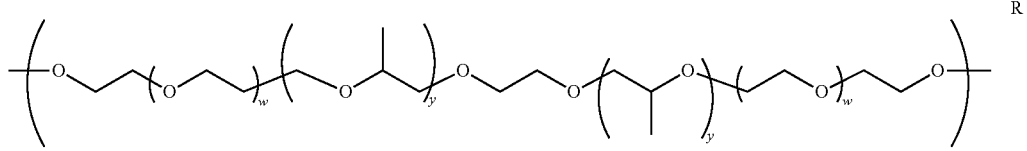

and R represents triblock copolymers with molecular weights in the range from 1000 to 4000 Daltons, of poly(ethylene oxide)$_w$-poly(propylene oxide)-poly(ethylene oxide)$_w$ type, obtained by the use of ethylene glycol as an initiator, w and y are numbers in the range of 10 to 60, $R_1$, $R_2$ and $R_3$ radicals are independently selected from the group consisting of —$CH_2(CH_2)_4B$; —CEGJ; —$CH_2CHLM$; —$CH_2(CH_2)_QM$;

where A is a number between 1 and 9, B is H,

E, G and J are a radical independently selected from the group consisting of: —H, methyl, ethyl, n-propyl, iso-propyl, sec-butyl, iso-butyl, tert-butyl, n-butyl, phenyl, cyclohexyl, and cyclopentyl, L is a radical represented by methyl or ethyl, and M is a hydroxyl group, Q is a number between 1 and 5, T is represented by groups E, G and J, $NO_2$, Cl, F and Br, $_4$ is a radical independently selected from the group consisting of —$(CH_2)_4B$; —OU; —$CH(C_6H_5)_2$; and —$C(C_6H_5)_3$, where A is a number between 1 and 9; B is H, U is a radical independently selected from the group consisting of methyl, ethyl and benzyl.

$R_5$ is a radical independently selected from the group consisting of -(2-methyl-phenyl), -(4-methyl-phenyl), and -(4-phenyl-phenyl); $R_6$ is a radical independently selected from the group consisting of -(4-methoxy-phenyl), -(4-piperazinyl), and $NO_2$, $R_7$ is a radical independently selected from the group consisting of Br, (phenyl-sulfanyl), and (methyl-sulfanyl); $R_8$ radical independently selected from the group consisting of $NO_2$ and Br; $R_9$ is a radical independently selected from the group consisting of Br; $R_{10}$ is a radical independently selected from the group consisting of -(octyloxy); $R_{11}$ is a radical independently selected from the group consisting of Br; $R_{12}$ is a radical selected from the group consisting of -methyl, -(4-methyl-phenyl), and -(2-methoxy-phenyl); $R_{13}$ is a radical selected from the group consisting of $NO_2$, -(4-methyl-phenyl), -(3-methyl-phenyl), -(2-methoxy-phenyl), and -(3-methoxy-phenyl); $R_{14}$ radical represented by -methyl, -(2-phenoxy-ethoxy), -(4-nitro-phenoxy), -(4-phenoxy-butoxy), and Z is a radical independently selected from the group consisting of methanesulfonate, benzenesulfonate and para-toluenesulfonate.

Examples of Suitable Compounds Include (IMP-CF23H) α,ω-di-para-toluensulfonate of poly(ethylene oxide)$_w$-poly(propylene oxide)$_y$-poly(ethylene oxide)$_w$ of bis-tri-octyl-ammonium: viscous liquid; I.R. ν cm$^{-1}$: 2978, 2953, 2870, 2790, 1595, 1459, 1383, 1354, 1174, 1100, 1069, 977, 825, 775, 752; $^{13}$C NMR (DMSO-d$_6$): 13.9, 17.1, 21.6, 21.2, 21.8, 25.7, 25.8, 42.7, 60.5, 60.7, 63.2, 70.2, 70.5, 72.9, 73.5, 75.1, 75.4, 75.7, 127.9, 130.0, 132.7, 145.1.

(IMP-CF24H) α,ω-di-benzensulfonate of poly(ethylene oxide)$_w$-poly(propylene oxide)$_y$-poly(ethylene oxide)$_w$ of bis-tri-hexyl-ammonium: viscous liquid; I.R. ν cm$^{-1}$: 2975, 2948, 2865, 2790, 1595, 1459, 1383, 1354, 1172, 1100, 1069, 975, 825, 775, 751; $^{13}$C NMR (DMSO-d$_6$): 14.0, 17.1, 22.5, 25.7, 27.0, 42.6, 60.7, 63.2, 70.2, 70.5, 72.9, 73.5, 75.1, 75.4, 75.7, 127.9, 129.41, 134.6, 135.1.

(IMP-CF25H) α,ω-di-benzensulfonate of poly(ethylene oxide)$_w$-poly(propylene oxide)$_y$-poly(ethylene oxide)$_w$ of bis-1H-methyl-imidazolium: viscous liquid; I.R. ν cm$^{-1}$: 3049, 2930, 2858, 1571, 1468, 1385, 1170, 1102, 1018, 895, 767, 655 $^{13}$C NMR (DMSO-d$_6$): 17.2, 36.2, 42.8, 60.6, 60.8, 63.1, 70.2, 70.4, 72.8, 75.1, 75.5, 75.7, 121.9, 123.7, 129.4, 134.5, 135.2, 137.6.

(IMP-CF26H) α,ω-di-benzensulfonate of poly(ethylene oxide)$_w$-poly(propylene oxide)$_y$-poly(ethylene oxide)$_w$ of bis-1H-butyl-imidazolium: viscous liquid; I.R. ν cm$^{-1}$: 3052, 2945, 2863, 1565, 1465, 1380, 1165, 1102, 1018, 896, 765, 655; $^{13}$C NMR (DMSO-d$_6$): 15.5, 17.2, 22.3, 31.0, 36.2, 45.1, 60.6, 60.8, 63.1, 70.2, 70.4, 72.8, 75.1, 75.5, 75.7, 122.1, 123.6, 127.4, 129.2, 133.5, 136.2, 137.6.

(IMP-CF27H) α,ω-di-benzensulfonate of poly(ethylene oxide)$_w$-poly(propylene oxide)$_y$-poly(ethylene oxide)$_w$ of bis-isochinolinium: viscous liquid; I.R. ν cm$^{-1}$: 3023, 2971, 2965, 2856, 1641, 1607; 1583, 1526, 1482, 1470, 1390, 1177, 1173, 1165, 1112, 1105, 983, 946, 819, 759; $^{13}$C NMR (DMSO-d$_6$): 17.1, 46.1, 60.4, 60.7, 64.1, 70.3, 70.4, 72.9, 75.2, 75.3, 75.7, 126.4, 127.1, 127.8, 128.0, 129.4, 131.2, 134.0, 134.5, 135.2, 137.0, 137.3, 150.2.

(IMP-CF28H) α,ω-di-benzensulfonate of poly(ethylene oxide)$_w$-poly(propylene oxide)$_y$-poly(ethylene oxide)$_w$ of bis-chinolinium: viscous liquid; I.R. ν cm$^{-1}$: 3056, 3024, 2950, 2921, 2865, 2728, 1624, 1598, 1590, 1525, 1466, 1407, 1383, 1276, 1209, 1175, 1165, 1153, 1134, 1105, 989, 875, 801, 777, 771; $^{13}$C NMR (DMSO-d$_6$): 17.2, 45.8, 60.4, 60.7, 64.1, 70.3, 70.4, 72.9, 75.2, 75.3, 75.7, 118.9, 122.2, 127.8, 129.3, 129.7, 129.80, 130.7, 135.1, 135.2, 137.3, 147.2, 149.5.

(IMP-CF29H) α,ω-di-benzensulfonate of poly(ethylene oxide)$_w$-poly(propylene oxide)$_y$-poly(ethylene oxide)$_w$ of bis-pyridinium: viscous liquid; I.R. ν cm$^{-1}$: 3068, 3010, 2970, 2960, 2850, 1633, 1620, 1598, 1482, 1436, 1388, 1275, 1217, 1174, 1162, 1108, 980, 872, 750; $^{13}$C NMR (DMSO-d$_6$): 17.1, 45.9, 60.4, 60.9, 64.0, 70.3, 70.4, 72.9, 75.2, 75.2, 75.7, 127.4, 128.0, 129.6, 134.1, 135.2, 142.1, 146.0.

The structures of the compounds are mainly α,ω-hydroxyl groups of poly(oxyethylene)$_w$-poly(oxypropylene)$_y$-poly(oxyethylene)$_w$ block copolymers (R) functionalized at the end with secondary or tertiary amines.

CF22 is a copolymer having a molecular weight of 2200 g/mol functionalized with diethanolamine.

CF22H is a copolymer having a molecular weight of 2360 g/mol functionalized with diethanolamine.

CF1 is a copolymer having a molecular weight of 2200 g/mol functionalized with ethylethanolamine.

CF19 is a copolymer with molecular weight of 2200 g/mol functionalized with methylethanolamine.

The method of the invention adds an effective amount of the desalting and dewatering agent to a heavy crude oil having a specific gravity of 14-20° API. The amount of the agent is added to the crude oil at a concentration of 100 to 600 ppm, preferably 1000 to 300 ppm, and more preferably 200 to 300 ppm.

Evaluation of the mixtures made from block copolymers α,ω-bifunctionalized with tertiary amines, and block copolymers α,ω-bifunctionalized with secondary amines, and the IMP-RHS-5 commercial formulation, as dehydrating and desalting agents of crude oils with API gravities in the interval of 14-20° API.

Different solutions of each bifunctionalized copolymer were prepared at 5-40 wt. % concentration, employing solvents with a boiling point between 35 and 200° C., preferentially dichloromethane, chloroform, benzene, toluene, xylene, turbosine, naphtha, individually or mixtures thereof, adding small volumes of solution and hindering carefully possible effects of the solvent on the emulsion breaking.

Crude oils employed in this evaluation are identified as (CM-A)-(CM-D), which are characterized as shown below:

TABLE NO. 1

Physicochemistry characterization of crude oils

| Test | CM-A | CM-B | CM-C | CM-D |
|---|---|---|---|---|
| API gravity | 14.9 | 16.3 | 18.4 | 19.3 |
| Salt content (lbs/1000 ls) | 10870 | 4000 | 1528 | 248 |
| Paraffin (wt. %) | 4.4 | 4.6 | 4.0 | 3.6 |
| Distilled water (vol. %) | 26.0 | 19 | 9.5 | 20 |
| Water/sediment (vol. %) | 24.7 | 18.5 | 9.7 | 19 |
| Runoff Temperature (° C.) | −18 | −30 | −27 | −30 |
| Kinematic viscosity (mm$^2$/s) | 2302 | 842 | 461 | 343 |
| Heptane Insoluble (wt. %) | 10.2 | 9.3 | 9.3 | 10.8 |
| Saturated (wt. %) | 11.8 | 16.0 | 17.5 | 20.7 |
| Aromatics (wt. %) | 31.7 | 22.9 | 26.9 | 26.8 |
| Resins (wt. %) | 45.7 | 50.4 | 44.7 | 43.4 |
| Asphaltenes (wt. %) | 10.8 | 10.7 | 10.9 | 9.1 |
| MW Cryoscopy (g/mol) | 511 | 432 | 365 | 370 |
| CII | 0.296 | 0.364 | 0.396 | 0.424 |

The evaluation procedure was described in detail in our previous U.S. published application, U.S. 2010/0140141, which is incorporated by reference in its entirety. By way of demonstration without limitation, the results are shown in the graphs, where the concentration range was from 100 ppm to 1200 ppm.

Evaluation started with the application of the IMP-RHS-5 formulation, FIG. 1 is shown that the IMP-RHS-5 formulation breaks up very quickly the emulsion of CM-A crude oil, and then stays stable in efficiency 62%.

FIG. 2 shows that the composition with the best performance is that which corresponds to 300 ppm/300 ppm, reaching complete rupture at 180 minutes. FIG. 3 shows the analysis by triplicate of the composition mentioned above and confirms that even if it took 20 days between each evaluation and despite the ageing of the crude oil, the composition follows to break up the emulsion, although it needs longer time (200 minutes) to make it. That means that the compositions are more effective in the desemulsification of CM-A crude oil when is compared with the IMP-RHS-5 formulation (FIG. 1).

FIG. 4 shows the emulsion treatment in the CM-B crude oil with seven different compositions of the IMP-CF1/IMP-CF23H formulations. It is noted that the best combination is 250 ppm/350 ppm, as achieved completely break the emulsion at 200 minute; FIG. 5 shows that even when the crude oil has aged, the composition earlier mentioned follow to break up the emulsion, despite the elapsed time (25 days) between each evaluation.

Furthermore, crude oil was treated with different compositions of IMP-CF22/IMP-CF23H at a temperature of 80° C., in order to break the emulsion. In FIG. 6, the performance of seven combinations IMP-CF22 and IMP-CF23H copolymers are observed, where the best combination was 250 ppm/250 ppm, resulting in the 100% emulsion breaking is reached in 210 minutes. In FIG. 7, it is clear that although the crude oil was oxidized by the passage of time. This composition remains effective but requires more time.

TABLE NO. 2

Desalted efficiency applied on crude CM-B with different compositions.

| Composition | ppm/ppm | Dehydrated % | Time[1] | Salt Remains[2] | Desalted % |
|---|---|---|---|---|---|
| IMP-CF22/ IMP-CF23H | 250/250 | 100 | 210 | 635 | 84.1 |
| IMP-CF22H/ IMP-CF 23H | 300/300 | 100 | 180 | 660 | 83.5 |
| IMP-CF1/ IMP-CF23H | 250/250 | 100 | 200 | 585 | 85.4 |

[1](minutes),
[2](lbs/1000 barrels)

From Table 2, it is shown that three compositions achieve the complete emulsion breaking in very similar times. The same thing happens with the desalting percentage.

In FIG. 8 shows the results of the evaluation in the CM-C crude oil (10% water). It is noted that the IMP-CF23H copolymer at 1200 ppm breaks up the 100% of the emulsion in 260 minutes. It is also observed the interesting behavior for two compositions because both compositions reach 100% of water removal at 300 minutes. The best formulation is IMP-CF22/IMP-CF23H (200 ppm/200 ppm) followed by the formulation IMP-CF19/IMP-CF23H (200 ppm/200 ppm), and finally, IMP-CF1/IMP-CF23H (200 ppm/200 ppm) with 80% efficiency at 260 minutes. At this point, it should be noted that there is synergism between the IMP-CF22 copolymers, 19 and 1 with IMP-CF23H copolymer, because the compositions are applied in a total of 400 ppm, which is an amount 66% less than 1200 ppm used when the IMP-23H was applied.

TABLE NO. 3

Desalting efficiency of CM-C crude oil with different compositions.

| Composition | ppm/ppm | Dehydrated % | Time[1] | Remains salt[2] | Desalted % |
|---|---|---|---|---|---|
| IMP-CF22/ IMP-CF23H | 200/200 | 100 | 300 | 227 | 85.2 |
| IMP-CF19/ IMP-CF23H | 200/200 | 100 | 300 | 260 | 83.0 |
| IMP-CF1/ IMP-CF23H | 200/200 | 80 | 260 | 510 | 66.6 |
| IMP-CF23H | 1200 | 100 | 260 | 160 | 89.5 |

[1](minutes),
[2](lbs/1000 barrels)

The highest percentage of desalting is achieved with IMP-CF23H, but at concentration of 1200 ppm. The compositions achieve the crude oil desalting at similar values, but using a much smaller amount.

FIGS. 9 and 10 (CM-D crude oil) show that the RHS5 commercial formulation has the worst performance achieving an efficiency of 40%. It is also observed that IMP-CF1 in combination with IMP-CF26H and IMP-CF27H show major disruptions in the order of 95% (320 minutes) and 100% (320 minutes), respectively.

FIGS. 11 and 12 show the behavior of the emulsion breaking by applying IMP-CF22H formulated with the IMP-CF23H and IMP-CF29H copolymers. The largest break up is achieved with IMP-CF25H 100% after 210 minutes and IMP-CF28H 100% after 210 minutes.

FIGS. 13 and 14 show the treatment applied to emulsified oil, with IMP-CF19H formulation in combination with IMP-CF23H and IMP-CF29H copolymers. IMP-CF26H at 320 minutes reaches an efficiency 100%. IMP-CF23H shows almost same behavior, but IMP-CF26H broke 5% more than IMP-CF23H after 120 minutes.

FIG. 15 shows that the composition breaks emulsion with greater efficiency. It is observed that the best compositions are IMP-CF26H/IMP-CF29H and IMP-CF25H/IMP-CF29H, which completely breaks the emulsion after 150 minutes.

Therefore, the compositions made in this invention, from block copolymers bifunctionalized with tertiary amines in combination with block copolymers bifunctionalized with secondary amines, are more effective in dehydrating and desalting of Mexican crude oils and heavy crude than the commercial formulation IMP-RHS-5.

What is claimed is:

1. A method of demulsifying, dewatering and desalting heavy crude oil comprising adding a composition to a crude oil having a specific gravity from 14° to 20° API for sufficient time to demulsify, dewater and desalt the crude oil, wherein said composition comprises a compound of formula (4)

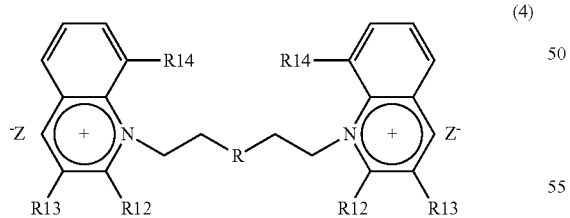

(4)

where R is

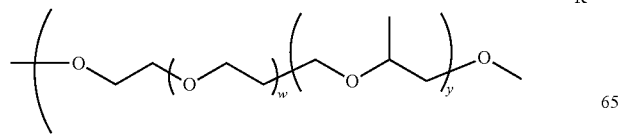

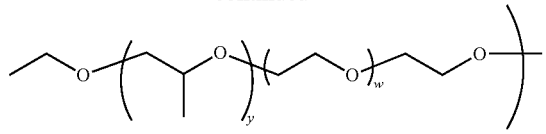

and R represents a copolymer with molecular weights in the range from 1000 to 4000 Daltons, w and y are independently a number to provide the molecular weight, $R_{13}$ is a radical selected from the group consisting of $NO_2$, -(4-methyl-phenyl), -(3-methyl-phenyl), -(2-methoxy-phenyl), and -(3-methoxy-phenyl); $R_{14}$ radical represented by -methyl, -(2-phenoxy-ethoxy), -(4-nitro-phenoxy), -(4-phenoxy-butoxy), and Z is a radical independently selected from the group consisting of methanesulfonate, benzenesulfonate and para-toluenesulfonate, and at least one amine bifunctionalized block copolymer of the formula 5a and 5b, having a molecular weight within the average range between 800 and 4000 Daltons

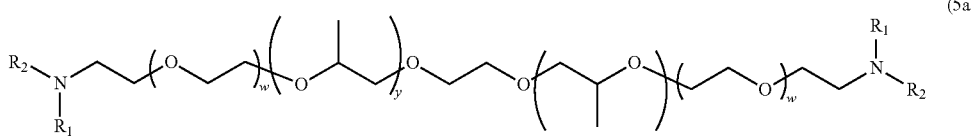

(5a)

where:

w and y are independently a number to provide the molecular weight;

$R_1$ and $R_2$ radicals are independently selected from the group consisting of —H; —$CH_2(CH_2)_4B$; —CEGJ; —$CH_2CHLM$; —$CH_2(CH_2)_QM$;

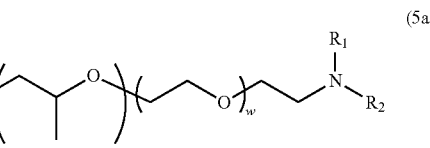

where A is a number between 1 and 9,

B is H,

E, G and J are independently a radical selected from the group consisting of: —H, methyl, ethyl, n-propyl, iso-propyl, sec-butyl, iso-butyl, tert-butyl, n-butyl, phenyl, cyclohexyl, cyclopentyl, L is a radical represented by methyl or ethyl and M is a hydroxyl group, Q is a number between 1 and 5, T is selected from the group consisting of —H, methyl, ethyl, n-propyl, iso-propyl, sec-butyl, iso-butyl, tert-butyl, n-butyl, phenyl, cyclohexyl, cyclopentyl, $NO_2$, Cl, F and Br, and

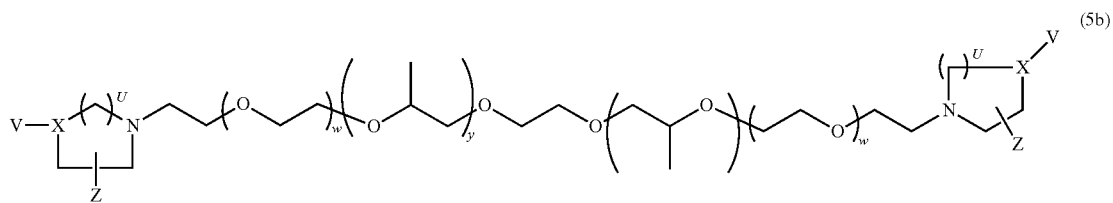

where:

U is 1 or 2,

X is represented by atoms of oxygen and nitrogen, when X is nitrogen then V is represented by, -methyl, ethyl, n-propyl, iso-propyl, sec-butyl, iso-butyl, tert-butyl, n-butyl phenyl, cyclohexyl, cyclopentyl, benzyl, Z is represented by methyl, ethyl, n-propyl, iso-propyl, sec-butyl, iso-butyl, tert-butyl, n-butyl, phenyl, cyclohexyl, cyclopentyl, benzyl or hydroxyl at any position of the 5 or 6 members' rings.

2. The method of claim 1, wherein said composition comprising said copolymers is added to said crude oil in an amount from 100 ppm to 600 ppm based on the amount of crude oil.

3. The method of claim 2, wherein each of said copolymers are added in an amount from 100 ppm to 300 ppm based on the amount of the crude oil.

4. The method of claim 1, wherein said composition further comprises a solvent having a boiling point from 35° to 200° C., and where said copolymers are in an amount from 100 ppm (0.01 wt %) to 50,000 ppm (5 wt %) based on the total weight of the composition.

5. The method of claim 4, wherein said solvent is selected from the group consisting of dichloromethane, chloroform, benzene, toluene, xylenes, turbosine, naphtha, and mixtures thereof.

6. A method of demulsifying, dewatering and desalting crude oil comprising the step of adding a demulsifying, dewatering and desalting composition to the crude oil in amount effective to demulsify, dewater and desalt the crude oil, wherein said composition comprises a) at least one block copolymer having a structural general formulas (4)

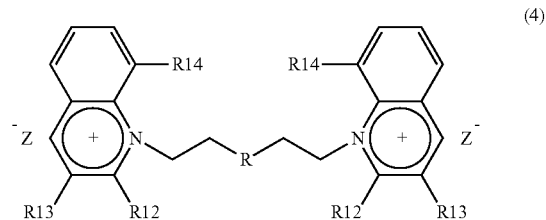

wherein R is a copolymer having a molecular weight between 1000 4000 Daltons, and having the formula

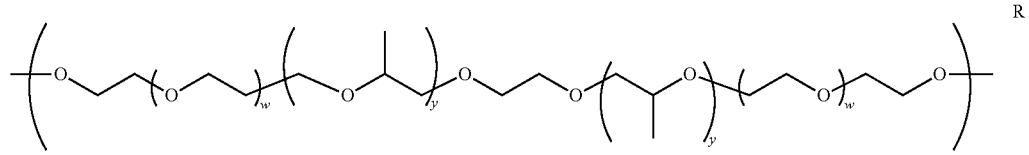

w and y are independently a number to provide the molecular weight, $R_{12}$ is a radical selected from the group consisting of -methyl, -(4-methyl-phenyl), and -(2-methoxy-phenyl);

$R_{13}$ is a radical selected from the group consisting of $NO_2$, -(4-methyl-phenyl), -(3-methyl-phenyl), -(2-methoxy-phenyl), and -(3-methoxy-phenyl);

$R_{14}$ radical represented by -methyl, -(2-phenoxy-ethoxy), -(4-nitro-phenoxy), -(4-phenoxy-butoxy), and Z is a radical independently selected from the group consisting of methanesulfonate, benzenesulfonate and para-toluenesulfonate, and b) at least one amine bifunctionalized block copolymer of the formula 5a and 5b, having a molecular weight within the average range between 800 and 4000 Daltons

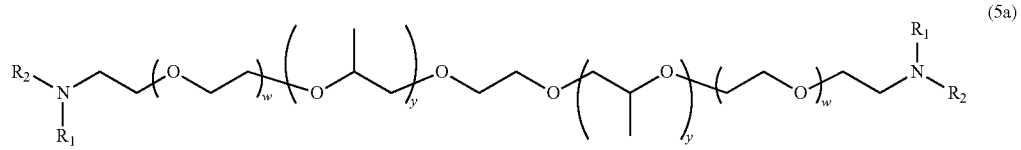

where:
w and y are independently a number to provide the molecular weight;
$R_1$ and $R_2$ radicals are independently selected from the group consisting of —H; —CH$_2$(CH$_2$)$_A$B; —CEGJ; —CH$_2$CHLM; —CH$_2$(CH$_2$)$_Q$M;

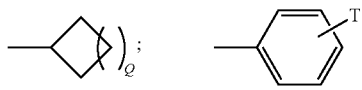

where A is number from 1 to 9,
B is H,
E, G and J are independently a radical selected from the group consisting of: —H, methyl, ethyl, n-propyl, iso-propyl, sec-butyl, iso-butyl, tert-butyl, n-butyl, phenyl, cyclohexyl, and cyclopentyl,
L is a radical represented by methyl or ethyl and M is a hydroxyl group,
Q is a number from 1 to 5, T is selected from the group consisting of —H, methyl, ethyl, n-propyl, iso-propyl, sec-butyl, iso-butyl, tert-butyl, n-butyl, phenyl, cyclohexyl, cyclopentyl, NO$_2$, Cl, F and Br, and

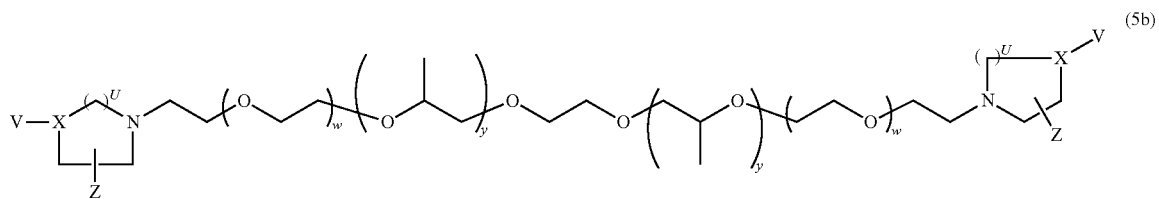

(5b)

where:
U is 1 or 2,
X is oxygen or nitrogen, and when X is nitrogen then V is selected from the group consisting of methyl, ethyl, n-propyl, iso-propyl, sec-butyl, iso-butyl, tert-butyl, n-butyl phenyl, cyclohexyl, cyclopentyl, and benzyl, and
Z is selected from the group consisting of methyl, ethyl, n-propyl, iso-propyl, sec-butyl, iso-butyl, tert-butyl, n-butyl, phenyl, cyclohexyl, cyclopentyl, benzyl and hydroxyl.

7. The method of claim 6, wherein each of said copolymers are added in an amount from 100 ppm to 300 ppm based on the amount of the crude oil.

8. The method of claim 6, wherein said composition further comprises a solvent having a boiling point 35° to 200° C., and where said copolymers are in an amount from 100 ppm (0.01 wt %) to 50,000 ppm (5 wt %) based on the total weight of the composition.

9. The method of claim 8, wherein said solvent is selected from the group consisting of dichloromethane, chloroform, benzene, toluene, xylenes, turbosine, naphtha, and mixtures thereof.

* * * * *